US011482348B2

(12) United States Patent
McInnis et al.

(10) Patent No.: US 11,482,348 B2
(45) Date of Patent: Oct. 25, 2022

(54) GRAPHITE OXIDE AND POLYACRYLONITRILE BASED COMPOSITE

(71) Applicant: Garmor Inc., Orlando, FL (US)

(72) Inventors: Matt McInnis, Orlando, FL (US); Jeff Bullington, Orlando, FL (US); David Restrepo, Orlando, FL (US); Richard Stoltz, Plano, TX (US); Sean Christiansen, Orlando, FL (US)

(73) Assignee: Asbury Graphite of North Carolina, Inc., Lumberton, NC (US)

(*) Notice: Subject to any disclaimer, the term of this patent is extended or adjusted under 35 U.S.C. 154(b) by 0 days.

(21) Appl. No.: 15/580,475

(22) PCT Filed: Mar. 31, 2016

(86) PCT No.: PCT/US2016/025338
§ 371 (c)(1),
(2) Date: Dec. 7, 2017

(87) PCT Pub. No.: WO2016/200469
PCT Pub. Date: Dec. 15, 2016

(65) Prior Publication Data
US 2018/0174700 A1 Jun. 21, 2018

Related U.S. Application Data

(60) Provisional application No. 62/173,041, filed on Jun. 9, 2015.

(51) Int. Cl.
*H01B 1/00* (2006.01)
*H01B 1/24* (2006.01)
*C01B 32/23* (2017.01)
*C01B 32/198* (2017.01)
*B05D 3/00* (2006.01)
*H01B 13/00* (2006.01)

(52) U.S. Cl.
CPC .............. *H01B 1/24* (2013.01); *B05D 3/007* (2013.01); *C01B 32/198* (2017.08); *C01B 32/23* (2017.08); *H01B 13/0016* (2013.01); *C01P 2004/61* (2013.01); *C01P 2004/62* (2013.01); *C01P 2004/64* (2013.01); *C01P 2006/32* (2013.01); *C01P 2006/40* (2013.01)

(58) Field of Classification Search
CPC ........ H01B 1/24; H01B 13/0016; H01B 1/00; C01B 32/23; C01B 32/198; C01B 32/00; B05D 3/007; B05D 3/00; H01M 4/00
See application file for complete search history.

(56) References Cited

U.S. PATENT DOCUMENTS

| | | |
|---|---|---|
| 2,459,520 A | 1/1949 | Greenshields |
| 4,046,863 A * | 9/1977 | Kobayashi ............ C04B 35/52 252/502 |
| 5,057,370 A | 10/1991 | Krieg et al. |
| 5,360,582 A | 11/1994 | Boyd et al. |
| 5,501,934 A | 3/1996 | Sukata et al. |
| 5,506,061 A | 4/1996 | Kindl et al. |
| 5,509,993 A | 4/1996 | Hirschvogel |
| 5,583,176 A | 12/1996 | Haberle |
| 5,883,176 A | 3/1999 | Gerroir et al. |
| 6,004,712 A | 12/1999 | Barbetta et al. |
| 6,172,163 B1 | 1/2001 | Rein et al. |
| 6,348,279 B1 | 2/2002 | Saito et al. |
| 6,436,567 B1 | 8/2002 | Saito et al. |
| 7,005,205 B1 | 2/2006 | Gyoten et al. |
| 7,231,084 B2 | 6/2007 | Tang et al. |
| 7,329,698 B2 | 2/2008 | Noguchi et al. |
| 7,623,340 B1 | 11/2009 | Song et al. |
| 8,168,964 B2 | 5/2012 | Hiura et al. |
| 8,216,541 B2 | 7/2012 | Jang et al. |
| 8,580,132 B2 | 11/2013 | Lin et al. |
| 9,758,379 B2 | 9/2017 | Blair |
| 10,138,969 B2 | 11/2018 | Hattori et al. |
| 10,287,167 B2 | 5/2019 | Blair |
| 2002/0008031 A1 | 1/2002 | Barsukov et al. |
| 2002/0119358 A1 | 8/2002 | Rock |
| 2002/0182387 A1 | 12/2002 | Mercuri et al. |
| 2004/0000735 A1 | 1/2004 | Gilbert, Sr. et al. |
| 2004/0033189 A1 | 2/2004 | Kaschak et al. |
| 2004/0071896 A1 | 4/2004 | Kang |
| 2004/0209150 A1 | 10/2004 | Rock et al. |
| 2005/0041373 A1 | 2/2005 | Pruss |
| 2005/0191471 A1 | 9/2005 | Haggquist |
| 2005/0196636 A1 | 9/2005 | Kawakami et al. |
| 2005/0208319 A1 | 9/2005 | Finley et al. |
| 2005/0266220 A1 * | 12/2005 | La Forest ............... D04H 1/72 428/292.1 |

(Continued)

FOREIGN PATENT DOCUMENTS

| | | |
|---|---|---|
| CN | 101462889 A | 6/2009 |
| CN | 102021633 A | 4/2011 |
| CN | 103058541 A | 4/2013 |
| CN | 103130436 A | 6/2013 |
| CN | 103215693 A * | 7/2013 |

(Continued)

OTHER PUBLICATIONS

CN 103757823 A, Google Patents.*
CN 102560746 A, Google Patents.*
CN103215693A—Google Patent, English translated (Year: 2013).*

(Continued)

*Primary Examiner* — David P Turocy
*Assistant Examiner* — Mohammad Mayy
(74) *Attorney, Agent, or Firm* — Edwin S. Flores; Chalker Flores, LLP

(57) ABSTRACT

The present method includes graphene, preferably in the form of flat graphene oxide flakes with, by mass, preferably between 0.5% and 35% PAN. The graphene oxide and conductive-polymer PAN is in a co-suspension in water and is co-deposited on a surface. The deposited PAN with a high-percentage graphene-oxide layer is dried. Our tests have produced electrical conductivities 1000 times more conductive than the PAN by itself. Our testing indicates that using flakes that are flat is essential to getting very high conductivity, and that controlled oxidation is very important in suspending graphene oxide in water.

7 Claims, No Drawings

(56) References Cited

U.S. PATENT DOCUMENTS

| | | |
|---|---|---|
| 2007/0219336 A1 | 9/2007 | Ito |
| 2007/0284557 A1 | 12/2007 | Gruner et al. |
| 2008/0048152 A1 | 2/2008 | Jang et al. |
| 2008/0206124 A1 | 8/2008 | Jang et al. |
| 2008/0279710 A1* | 11/2008 | Zhamu ............... B22F 1/0059 419/6 |
| 2008/0318110 A1 | 12/2008 | Budinski et al. |
| 2009/0017211 A1 | 1/2009 | Cruner et al. |
| 2009/0092747 A1 | 4/2009 | Zhamu et al. |
| 2009/0140801 A1 | 6/2009 | Ozyilmaz et al. |
| 2009/0215953 A1* | 8/2009 | Hwang ................. B82Y 30/00 524/496 |
| 2009/0224420 A1* | 9/2009 | Wilkinson .............. D01D 5/12 264/211.15 |
| 2009/0241496 A1 | 10/2009 | Pintault et al. |
| 2010/0006445 A1 | 1/2010 | Tomatschger |
| 2010/0028681 A1 | 2/2010 | Dai et al. |
| 2010/0055025 A1 | 3/2010 | Jang et al. |
| 2010/0055458 A1 | 3/2010 | Jang et al. |
| 2010/0056819 A1 | 3/2010 | Jang et al. |
| 2010/0092809 A1 | 4/2010 | Drzal et al. |
| 2010/0143732 A1 | 6/2010 | Swift et al. |
| 2010/0147188 A1 | 6/2010 | Mamak et al. |
| 2010/0151318 A1 | 6/2010 | Lopatin et al. |
| 2010/0209731 A1 | 8/2010 | Humano |
| 2010/0239870 A1 | 9/2010 | Bowen |
| 2010/0296253 A1 | 11/2010 | Miyamoto et al. |
| 2010/0317790 A1 | 12/2010 | Jang et al. |
| 2011/0017585 A1 | 1/2011 | Zhamo et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0120347 A1 | 5/2011 | Chung et al. |
| 2011/0143018 A1 | 6/2011 | Peng et al. |
| 2011/0143107 A1 | 6/2011 | Steinig-Nowakowski |
| 2011/0159372 A1 | 6/2011 | Zhamu et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0021224 A1* | 1/2012 | Everett ............. H01L 21/02425 428/408 |
| 2012/0025131 A1* | 2/2012 | Forero .................... C08K 3/04 252/71 |
| 2012/0025420 A1 | 2/2012 | Utashiro et al. |
| 2012/0055612 A1 | 3/2012 | Ahmed et al. |
| 2012/0065309 A1 | 3/2012 | Agrawal et al. |
| 2012/0077017 A1 | 3/2012 | Buresch |
| 2012/0107562 A1 | 3/2012 | Bolotin et al. |
| 2012/0129736 A1 | 5/2012 | Tour et al. |
| 2012/0184065 A1* | 7/2012 | Gharib ................. C01B 32/186 438/99 |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1* | 1/2013 | Fugetsu ................. B82Y 30/00 252/500 |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0236715 A1* | 9/2013 | Zhamu ................. B82Y 30/00 428/220 |
| 2013/0240033 A1 | 9/2013 | Jeon et al. |
| 2013/0264041 A1 | 10/2013 | Zhamu et al. |
| 2013/0272950 A1 | 10/2013 | Yun et al. |
| 2013/0330833 A1* | 12/2013 | Ruiz ................. B01D 39/1692 436/174 |
| 2014/0000751 A1* | 1/2014 | Kagumba .......... C08G 63/6926 525/437 |
| 2014/0018480 A1 | 1/2014 | Lee et al. |
| 2014/0030590 A1 | 1/2014 | Wang et al. |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0266739 A1 | 9/2015 | Zhamu et al. |
| 2015/0284253 A1 | 10/2015 | Zhamu et al. |
| 2016/0016803 A1 | 1/2016 | Stoltz et al. |
| 2016/0083552 A1 | 3/2016 | Nosker et al. |
| 2016/0144339 A1 | 5/2016 | Kim et al. |
| 2016/0216629 A1 | 7/2016 | Grinwald |
| 2017/0166722 A1 | 6/2017 | Zhamu et al. |
| 2017/0233290 A1 | 8/2017 | Christiansen et al. |
| 2019/0051903 A1 | 2/2019 | Manabe et al. |

FOREIGN PATENT DOCUMENTS

| | | | |
|---|---|---|---|
| CN | 103215693 A | 7/2013 | |
| CN | 103408880 A | 11/2013 | |
| CN | 103569997 A * | 2/2014 | ............. Y02E 60/10 |
| CN | 103757823 A | 4/2014 | |
| CN | 103819915 A | 5/2014 | |
| CN | 103962102 A | 8/2014 | |
| CN | 104319372 A | 1/2015 | |
| CN | 104446176 A | 3/2015 | |
| CN | 106700356 A | 5/2017 | |
| CN | 108276576 A | 7/2018 | |
| EP | 0949704 A1 | 10/1999 | |
| EP | 1227531 A1 | 7/2002 | |
| EP | 2560228 A1 | 2/2013 | |
| GB | 723598 A | 2/1955 | |
| JP | S6169853 A | 4/1986 | |
| JP | 64-009808 A | 1/1989 | |
| JP | 2012007224 A | 1/2012 | |
| JP | 2012136567 A | 7/2012 | |
| KR | 20110119429 A | 11/2011 | |
| KR | 20130048741 A | 4/2013 | |
| KR | 20130090979 A | 8/2013 | |
| KR | 1020150026092 | 3/2015 | |
| KR | 1020170019802 | 2/2017 | |
| RU | 2456361 C1 | 7/2012 | |
| WO | 2009032069 | 3/2009 | |
| WO | 2009059193 A1 | 5/2009 | |
| WO | 2010089326 A1 | 8/2010 | |
| WO | 2010091352 A2 | 8/2010 | |
| WO | 2011014242 A1 | 2/2011 | |
| WO | 2011074125 | 6/2011 | |
| WO | 2011078639 A2 | 6/2011 | |
| WO | 2011086391 A1 | 7/2011 | |
| WO | 2011087301 | 7/2011 | |
| WO | 2011099761 A2 | 8/2011 | |
| WO | 2011162727 A1 | 12/2011 | |
| WO | 2012058553 A2 | 5/2012 | |
| WO | 2012148880 A2 | 11/2012 | |
| WO | 2013001266 A1 | 1/2013 | |
| WO | 2013096990 A1 | 7/2013 | |
| WO | 2014062226 A1 | 4/2014 | |
| WO | 2014138587 A1 | 9/2014 | |
| WO | 2015065893 A1 | 5/2015 | |
| WO | 2016040612 A1 | 3/2016 | |
| WO | 2016123080 A1 | 8/2016 | |
| WO | 2016154057 | 9/2016 | |
| WO | 2016200469 A1 | 12/2016 | |
| WO | 2017053204 A1 | 3/2017 | |
| WO | 2018008143 A1 | 5/2018 | |

OTHER PUBLICATIONS

"The effect of residence time on the physical characteristics of PAN-based fibers produced using a solvent-free coagulation process", M.A. Rahman, A.F. Ismail, A. Mustafa, Materials Science and Engineering A 448 (2007) 275-280 (Year: 2007).*

(56) References Cited

OTHER PUBLICATIONS

"Nanostructures and Surface Nanomechanical Properties of Polyacrylonitrile/Graphene Oxide Composite Nanofibers by Electrospinning", Qingqing Wang, Yuanzhi Du, Quan Feng, Fenglin Huang, Keyu Lu, Jingyan Liu, Qufu Wei, J. Appl. Polym. Sci. 2013, DOI: 10.1002/APP.38273. (Year: 2013).*
CN102586952A (Year: 2012).*
CN102586952A—Google Patents (Year: 2012).*
CN103545536A—(Year: 2014).*
CN103545536A—Google Patents (Year: 2014).*
CN-103569997-A, Google Patents (Year: 2014).*
Extended European Search Report and Opinion for EPO 17185605.7 dated Nov. 29, 2017, 7 pp.
International Search Report and Written Opinion for PCT/US2017/058512 from KIPO dated Feb. 7, 2018, 14 pp.
Academic Press Dictionary of Science and Technology ("Flake", p. 1, obtained online Aug. 19, 2016).
Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.
Ebinezar, et al., "Analysis of hardness test for aluminum carbon nanotube metal matrix and graphene," Indian Journal of Engineering, vol. 10, No. 21, 2014, pp. 33-39.
Extended European Search Report and Opinion for EPO 12844344.7 dated Oct. 22, 2015, 8 pp.
Extended European Search Report and Opinion for EPO 14759787.6 dated Oct. 6, 2016, 13 pp.
Extended European Search Report and Opinion for EPO 14760912.7 dated May 11, 2016, 8 pp.
Fang, M., et al., ""Covalent polymer functionalization of graphenenanosheets and mechanical properties of composites"" Journal of Materials Chemistry, 2009, vol. 19, No. 38, pp. 7098-7105.
Feng, H., et al., "A low-temperature method to produce highly reduced graphene oxide," Nature Communications, Feb. 26, 2013, 8 pp.
FMC, Persulfates Technical Information, (http://ww.peroxychem.com/media/90826/aod_brochure_persulfate.pdf, downloaded on Jan. 19, 2017) 16 pp.
Herman, A., et al., "Bipolar plates for PEM fuel cells: a review." International Journal of Hydrogen Energy, 2005, vol. 30, No. 12, pp. 1297-1302.
Hwang, T., et al., "One-step metal electroplating and patterning on a plastic substrate using an electrically-conductive layer of few-layer graphene," Carbon, Sep. 17, 2011, vol. 50, No. 2, pp. 612-621.
International Search Report and Written Opinion for PCT/US2012/061457 from KIPO dated Mar. 15, 2013, 10 pp.
International Search Report and Written Opinion for PCT/US2014/021765 from KIPO dated Jul. 24, 2014, 11 pp.
International Search Report and Written Opinion for PCT/US2014/021810 from KIPO dated Jul. 14, 2014, 10 pp.
International Search Report and Written Opinion for PCT/US2014/062371 from KIPO dated Feb. 11, 2015, 12 pp.
International Search Report and Written Opinion for PCT/US2015/045657 from KIPO dated Oct. 27, 2015, 6 pp.
International Search Report and Written Opinion for PCT/US2015/049398 from KIPO dated Dec. 16, 2015, 13 pp.
International Search Report and Written Opinion for PCT/US2016/014873 from KIPO dated May 13, 2016, 15 pp.
International Search Report and Written Opinion for PCT/US2016/022229 from KIPO dated Jun. 27, 2016, 15 pp.
International Search Report and Written Opinion for PCT/US2016/023273 from KIPO dated Jul. 12, 2016.
International Search Report and Written Opinion for PCT/US2016/023435 from KIPO dated May 30, 2016, 13 pp.
International Search Report and Written Opinion for PCT/US2016/025307 from KIPO dated Sep. 12, 2016, 11 pp.
International Search Report and Written Opinion for PCT/US2016/025338 from KIPO dated Jul. 25, 2016, 12 pp.
International Search Report and Written Opinion for PCT/US2016/052292 from KIPO dated Nov. 21, 2016, 14 pp.
International Search Report and Written Opinion for PCT/US2017/027231 from KIPO dated Jul. 11, 2017, 18 pp.
Jeon, I., et al., ""Edge-carboxylated graphene nanosheets via ball milling."" Proceedings of the National Academy of Sciences of the United States of AmericaPNAS, Apr. 10, 2012, vol. 109, No. 15, pp. 5588-5593.
Liu, Y. B., et al., "Recent development in the fabrication of metal matrix-particulate composites using powder metallurgy techniques," Journal of Materials Science, vol. 29, No. 8, 1994, pp. 1999-2007.
McQuarrie (2011, General Chemistry (4th Edition). University Science Books, Appendix G Standard Reduction Voltages for Aqueous Solutions at 25C, p. A-34 to A-37 and also p. 949, Table 25.3. Online version available at:http://app.knovel.com/hotlink!loc/id:kpGCE00013/general-chemistry-4th/general-chemistry-4th).
Merriam-Webster ("Definition of Flake" p. 1-9, obtained online Aug. 19, 2016).
Mohajerani, E., et al., "Morphological and thickness analysis for PMMA spin coated films," Journal of Optoelectronics and Advanced Materials, vol. 9:12, Dec. 2007, p. 3901-3906.
Moustafa, S.F., et al., "Copper matrix SiC and A1203 particulate composites by powder metallurgy technique," Materials Letters, 2002, vol. 53, No. 4, pp. 244-249.
Ong, T. S., et al., "Effect of atmosphere on the mechanical milling of natural graphite," Carbon, 2000, vol. 38, No. 15, pp. 2077-285.
Rafiee, M. et al., "Fracture and fatigue in graphene nanocomposites." Small, 2010, vol. 6, No. 2, pp. 179-183.
Steurer, P., et al., ""Functionalized graphenes and thermoplasticnanocomposites based upon expanded graphite oxide."" Macromolecular Rapid Communications, 2009, vol. 30, Nos. 4-5, pp. 316-327.
Szabo, T., et al., "Evolution of Surface Functional Groups in a Series of Progressively Oxidized Graphite Oxides," Chem. Mater., vol. 18, Mar. 29, 2006, pp. 2740-2749.
Taeseon, H., et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.
USP Technologies, "What is the pH of H2O2 solutions?," http://www.h2o2.com/faqs/FaqDetail.aspx?fId=26, accessed Jan. 19, 2017, 2 pp.
Wang, X. et al., ""In situ polymerization of graphene nanosheets andpolyurethane with enhanced mechanical and thermal properties."" Journal of materials Chemistry, 2011, vol. 21, No. 12, pp. 4222-4227.
Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.
Wu, Z-S. et al., "Field Emission of Single-Layer Films Prepared by Electrophoretic Deposition." Advanced Materials, 21, 2009, pp. 1756-1760.
Zhao, W., et al., "Preparation of graphene by exfoliation of graphite using wet ball milling." Journal of Materials Chemistry, Jun. 3, 2010, vol. 20, pp. 5817-5819.
Kaur, S., et al., "Enhanced thermal transport at covalently functionalized carbon nanotube array interfaces," Nature Communications, Jan. 22, 2014, pp. 1-8.
Maguire, J. A., et al., "Efficient low-temperature thermal functionalization of alkanes. Transfer dehydrogenation catalyzed by Rh(PMe3)2CI(CO) in solution under a high-pressure hydrogen atmosphere," J. Am. Chem. Soc., Aug. 1, 1991, vol. 113:17, pp. 6706-6708.
Kirschner, M., "Ozone," Ullmann's Encyclopedia of Industrial Chemistry, vol. 25, 2012, pp. 637-644.
Minus, M., et al., "The Processing, Properties, and Structure of Carbon Fibers," JOM, Feb. 2005, pp. 52-58.
Pauling, L., General Chemistry, Chapter 15, "Oxidation-Reduction Reactions. Electrolysis," Dover Publications, Inc., 1970, 41 pp.
Polymers: A Properties Database, "Poly(ethylene terphthalate)", Chemnetbase, downloaded from http://poly.chemnetbase.com, Jan. 24, 2016, 5 pp.

(56) References Cited

OTHER PUBLICATIONS

Extended European Search Report for EP 16849382.3 dated Apr. 30, 2019, 10 pp.

Extended European Search Report for EP 17865997.5 dated Jul. 22, 2019, 7 pp.

International Search Report and Written Opinion for PCT/US2019/051405 from KIPO dated Jan. 3, 2020, 11 pp.

Xia, et al., "Effects of resin content and preparing conditions on the properties of polyphenylene sulfide resin/graphite composite for bipolar plate," Journal of Power Sources, vol. 178, Dec. 5, 2007, pp. 363-367.

Babak, F., et al., "Preparation and Mechanical Properties of Graphene Oxide: Cement Nanocomposites," The Scientific World Journal, vol. 2014, ID 276323, 10 pp.

Extended European Search Report for EP 15834377.2 dated Mar. 9, 2018, 8 pp.

Extended European Search Report for EP 16780450.9 dated Jul. 13, 2018, 18 pp.

Wu, Q., et al., "Suprecapacitors Based on Flexible Graphene/Polyaniline Nanofiber Composite Films," ACS Nano (2010), 4(4):1963-1970.

Chemical Book, «https://www.chemicalbook.com/ChemicalProductProperty_EN_CB8295389.htm», year 2017.

Chemical Book, «https://www.chemicalbook.com/ProductChemical PropertiesCB8123794_EN.htm», year 2017.

Gong, et al., "Optimization of the Reinforcement of Polymer-Based Nanocomposites with Graphene," ECCM 15-15th European Conference on Composite Materials, Venice, Italy, Jun. 24-28, 2012.

Gulotty, R., et al., "Effects of Functionalization on Thermal Properties of Single-Wall and Multi-Wall Carbon Nanotube—Polymer Nancomposites," UC Riverside—Polytechnic of Turin (2013), 25 pp.

Porter, Roger S. et al., "Property Opportunities with Polyolefins, A Review Preparations and Applications of High Stiffness and Strength by Uniaxial Draw," Polymer, 35:23, 1994, pp. 4979-4984.

Song, M., et al., "The Effect of Surface Functionalization on the Immobilization of Gold Nanoparticles on Graphene Sheets," Journal of Nanotechnology, vol. 2012, Art. ID 329318, Mar. 28, 2012, 5 pp.

Extended European Search Report for EP 19862892.7 dated Oct. 12, 2021, 11 pp.

Osicka, et al., "Light-Induced and Sensing Capabilities of SI-ATRP Modified Graphene Oxide particles in Elastomeric Matrix," Active and Passive Smart Structures and Integrated Systems 2017, vol. 10164, 1016434, doi: 10.1117/12.2260703, 10.pp.

Wang, Y., et al., "Kevlar oligomer functionalized graphene for polymer composites," Polymer, 52, Jun. 15, 2011, 3661-3670.

Zheng, H., et al., "Graphene oxide-poly (urea-formaldehyde) composites for corrosion protection of mild steel," Corrosion Science, Apr. 27, 2018, 139, pp. 1-12.

* cited by examiner

GRAPHITE OXIDE AND POLYACRYLONITRILE BASED COMPOSITE

CROSS-REFERENCE TO RELATED APPLICATIONS

This application is the National Stage of International Application No. PCT/US2016/025338, filed on Mar. 31, 2016 claiming the priority to U.S. Provisional Application No. 62/173,041 filed on Jun. 9, 2015, the contents of each of which are incorporated by reference herein.

TECHNICAL FIELD OF THE INVENTION

The present invention relates in general to the field of high electrical conductivity nanocomposites, and more particularly, to graphene based additives to enhance electrical conductivity.

BACKGROUND OF THE INVENTION

Without limiting the scope of the invention, its background is described in connection with compound conductive materials.

Polyacrylonitrile (PAN) is a synthetic resin prepared by the polymerization of acrylonitrile. PAN is the starting precursor for the creation of carbon fiber. PAN is first polymerized and pulled into a fiber. The pulled fiber has an initial diameter on the order of 200 μm. The PAN fiber goes through a series of thermal and chemical treatments to produce a carbon fiber or filament on the order of 10 μm. Creating a carbon fiber structure with a 250 μm diameter to weave a fabric requires an excessive amount of PAN. PAN has none of the hazardous properties of the monomer due to the formation of strong chemical bonds between the nitrile (CN) groups. PAN does not melt without decomposing, and in most cases, the polymer is dissolved in a Dimethylformamide (DMF) dimethylsulphoxide (DMSO) or other solvent prior to being spun or pulled into a fiber. PAN is not as widely used as the simple acrylics because of the higher cost of the precursor. The GNFs have an entangled micro-fibril structure.

The synthesis of carbon fibers from a PAN fiber in general involves three processing steps: i) stabilization, ii) carbonization and iii) graphitization. The stabilization processing step is where PAN is heated to 200-300° C. in an oxygen-containing atmosphere. Heating the PAN 200-300° C. in an oxygen stabilizes the molecular structure and prevents reactions between the fiber in the subsequent processing stems at higher temperatures. This also prevents chain scission and mass loss that occurs when a PAN fiber is heated in an inert atmosphere without stabilization. The carbonization processing step requires 500° C., in an inert atmosphere or vacuum. The graphitization processing step requires 1500° C.

Graphene is an allotrope of carbon. Graphene's structure can be a one-atom-thick planar sheet of $sp^2$-bonded carbon atoms that are densely packed in a honeycomb or hexagonal crystal lattice. The carbon-carbon bond length in graphene is about 1.42 Å. Graphene sheets stack to form graphite with an inter-planar spacing of 3.35 Å. Multiple graphene sheets/flakes are bonded together by van der Waals forces.

Graphene can be oxidized by a number of processes including thermal, chemical or mechanochemical. Reduction of graphite oxide monolayer films e.g. by hydrazine, annealing in argon/hydrogen was reported to yield graphene films of low quality; the flakes are not flat.

Graphene oxide can be produced in significant quantities from microcrystalline graphite that is treated with a mixture of acids such as sulfuric, nitric, and other oxidizing chemicals in combination with mechanical and/or thermal energy elements. This processing will produce graphene oxide flakes with diameters ranging from a few nanometers to tens of microns depending on the specific processing environment. If one uses a shaker mill in conjunction with an oxidizing agent the time duration in the mill will determine the size of the flake of graphene oxide. In general, the longer the processing time in the mill, the smaller the graphene oxide flake. The oxidizing process can produce a carboxyl group on the perimeter of the flake. The graphene flakes can be suspended in a number of solutions including but not limited to: tetrahydrofuran, tetrachloromethane, water, and/or dichloroethane.

Graphene is one of the strongest materials and most electrically conductive ever tested. Measurements have shown that graphene has a breaking strength 200 times greater than steel, with a tensile modulus (stiffness) of 1 TPa (150,000,000 psi). An Atomic Force Microscope (AFM) has been used to measure the mechanical properties of a suspended graphene sheet. Graphene sheets, held together by Van der Waals forces, were suspended over $SiO_2$ cavities where an AFM tip was probed to test its mechanical properties. Its spring constant was in the range 1-5 N/m and the Young's modulus was 0.5 TPa (500 GPa) thereby demonstrating that graphene can be mechanically very strong and rigid. Measurements of the electrical properties showed to be more conductive than copper. The enhanced conductivity is associated with the electrons being transmitted on the $sp^2$ orbitals that extend out of the plane of the two dimensional graphene structure. Graphene and graphene oxide nanocomposites have superior mechanical, thermal, and electrical properties. Improvement in the physicochemical properties of the nanocomposites depends on the distribution of the graphene oxide layers as well as interfacial bonding between the graphene oxide layers and the host.

SUMMARY OF THE INVENTION

In one embodiment, the present invention includes a method of making an electrical and/or thermal conductor, comprising: providing a surface; providing a co-suspension of at least one of graphene (G) or graphene oxide (GO) flakes and polyacrylonitrile (PAN), comprising between 1% and 25% by mass PAN and between 99% and 75% by mass flakes, in a dimethylformamide (DMF) solvent to form a G/GO-PAN layer. In one aspect, the method further comprises the step of casting or extruding an arbitrary structure of the co-suspension in a water-containing fluid. In another aspect, the method further comprises the step of casting or extruding an arbitrary shape of the co-suspension of G/GO-PAN structure in water. In another aspect, the method further comprises the step of forming a G/GO-PAN structure by at least one of: drying the G/GO-PAN structure by heating, vacuum, or a combination of heating and vacuum; stabilizing the G/GO-PAN structure by heating the structure in an oxygen containing atmosphere; carbonizing the G/GO-PAN structure by heating the layer up to 800° C. in an inert atmosphere or vacuum; or graphitizing the G/GO-PAN structure by heating the layer up to 1,500° C. in an inert atmosphere or vacuum. In another aspect, the G/GO-PAN layer is compacted by a press applying up to 300 MPA. In another aspect, the PAN is between 0.5% and 35% weight to volume. In another aspect, the G/GO flakes are 5 to 50 micron across. In another aspect, the G/GO flakes are 1 to 20 micron across. In another aspect, the G/GO flakes are 0.05 to 1 micron across. In another aspect, the G/GO-PAN structure is diffused with a non-Newtonian fluid in voids in the surface or a substrate. In another aspect, the method further comprises the step of pressing the G/GO-PAN through a stylist, or spinneret to form a fiber.

Another embodiment of the present invention includes a method of fabricating an electronic device; comprising of a high surface area electrode for an energy storage devices by: providing a surface or structure; providing a co-suspension of at least one of graphene (G) or graphene oxide (GO) flakes and polyacrylonitrile (PAN), comprising between 1% and 25% by mass PAN and between 99% and 75% by mass flakes, in a dimethylformamide (DMF) solvent to form a G/GO-PAN layer; and forming a G/GO-PAN structure by at least one of: drying the G/GO-PAN structure by heating, vacuum, or a combination of heating and vacuum; stabilizing the G/GO-PAN structure by heating the structure in an oxygen containing atmosphere; carbonizing the G/GO-PAN structure by heating the layer up to 800° C. in an inert atmosphere or vacuum; or graphitizing the G/GO-PAN structure by heating the layer up to 1,500° C. in an inert atmosphere or vacuum. In one aspect, the G/GO-PAN structure is diffused with a non-Newtonian fluid in voids in the substrate or structure. In another aspect, the G/GO-PAN layer is compacted by a press applying up to 300 MPA. In another aspect, the PAN is between 0.5% and 35% weight to volume. In another aspect, the G/GO flakes are 5 to 50 micron across. In another aspect, the G/GO flakes are 1 to 20 micron across. In another aspect, the G/GO flakes are 0.05 to 1 micron across. In another aspect, the method further comprises the step of casting or extruding an arbitrary structure of the co-suspension in a water-containing fluid. In another aspect, the method further comprises the step of casting or extruding an arbitrary shape of the co-suspension of G/GO-PAN structure in water.

The present method includes compositions and methods for using graphene in the form of graphene oxide flakes with oxidation between 0.01% and 25% by weight; preferably between 2% and 20%. The graphene oxide and Polyacrylonitrile (PAN) can be suspended in Dimethylformamide (DMF).

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are illustrative of ways to make and use the invention and do not delimit the scope of the invention.

As used herein, the term "graphene" refers to a polycyclic hexagonal lattice with carbon atoms covalently bonded to each other. The covalently bonded carbon atoms can form a six-member ring as a repeating unit, and may also include at least one of a five-member ring and a seven-member ring. Multiple graphene layers are referred to in the art as graphite. Thus, graphene may be a single layer, or also may comprise multiple layers of graphene that are stacked on other layers of graphene yielding graphene oxide. Generally, graphene oxide can have a maximum thickness of about 100 nanometers (nm), specifically about 0.5 nm to about 90 nm.

As used herein, the term "graphene oxide flake" refers to a crystalline or "flake" form of graphene oxide that has been oxidized and includes many graphene sheets oxidized and stacked together and can have oxidation levels ranging from 0.01% to 25% by weight in ultra pure water. The flakes are preferably substantially flat.

As used herein, the term suspension refers to a combination of PAN/GO suspension in a DMF solvent.

The present method includes graphene in the form of graphene oxide flakes with oxidation between 0.01% and 25% by weight; preferably between 2% and 20%. The graphene oxide and Polyacrylonitrile (PAN) can be suspended in Dimethylformamide (DMF). The novel loading herein of PAN relative to the GO is between 0.1% and 50% by weight; this can be suspended in the DMF. The suspension can then be extruded into water-containing fluid. The PAN hydrolyzes in the water to form a gel that envelops the GO flakes. The resulting hydrolyzed-PAN and GO material can be shaped or stamped in any form; e.g. a fiber, cube, etc. The hydrolyzed-PAN and GO material may be injected into a mold. The hydrolyzed PAN (H-PAN) and GO molded structure shall be known herein as H-PAN/GO molded structure. The H-PAN/GO molded structure can be heated in three processing steps: i) stabilization, ii) carbonization, and iii) graphitization. The stabilization processing step is heated to 200-300° C. in an oxygen-containing atmosphere. The heating of the H-PAN/GO molded structure 200-300° C. in oxygen can stabilize the PAN molecular structure for subsequent processing stems at higher temperatures. This also reduces mass loss that occurs when a H-PAN/GO molded structure is heated in an inert atmosphere. The carbonization of PAN in the H-PAN/GO molded structure occurs when it is at 500° C. to 800° C., in an inert atmosphere or vacuum.

A carbonized H-PAN/GO molded structure will be sufficient for many commercial applications without graphitization. The graphitization processing step for the H-PAN/GO molded structure requires 1500° C., in an inert atmosphere or vacuum. Graphitization is required for forming strong chemical and mechanical bonds within the H-PAN/GO molded structure mainly for mechanical and strength applications. The heating profile may also be accomplished in a mechanical press to further improve the physical properties.

In some embodiments, the GO flakes are 5 to 50 micron across; e.g. 5 to 20 micron across; 0.05 to 5 micron across; or 5 to 14 micron across.

In some embodiments the H-PAN/GO suspension in DMF is pressed through a stylist, or spinneret to form a fiber.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. In certain embodiments, the present invention may also include methods and compositions in which the transition phrase "consisting essentially of" or "consisting of" may also be used.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making an electrical and thermal conductor, comprising:
   providing microcrystalline graphite;
   producing flat graphene oxide (GO) flakes 5 to 50 microns across by simultaneously (1) treating the microcrystalline graphite with one or more oxidizing chemicals and (2) milling the microcrystalline graphite;
   preparing a co-suspension of the flat GO flakes and polyacrylonitrile (PAN) in a solvent consisting of dimethylformamide (DMF), wherein the co-suspension comprises between 1% and 25% PAN by mass and between 75% and 90% flat GO flakes by mass;
   casting or extruding the co-suspension into a water-containing fluid or into water, wherein the PAN is hydrolyzed, forming a gel that envelops the GO flakes, resulting in a H-PAN/GO material;
   injecting the H-PAN/GO material into a mold, resulting in a H-PAN/GO molded structure; and
   graphitizing the H-PAN/GO molded structure by heating at 1,500° C. in a mechanical press in an inert atmosphere or a vacuum.

2. The method of claim 1, wherein the flat GO flakes are 5 to 20 microns across.

3. The method of claim 1, wherein the flat GO flakes are 5 to 14 microns across.

4. The method of claim 1, further comprising the step of pressing the H-PAN/GO material through a stylist, or spinneret to form a fiber.

5. A method of fabricating an electronic device comprising a high surface area electrode for an energy storage device by:
   providing microcrystalline graphite;
   producing flat graphene oxide (GO) flakes 5 to 50 microns across by simultaneously (1) treating the microcrystalline graphite with one or more oxidizing chemicals and (2) milling the microcrystalline graphite;
   preparing a co-suspension of the flat GO flakes and polyacrylonitrile (PAN) in a solvent consisting of dimethylformamide (DMF), wherein the co-suspension comprises between 1% and 25% PAN by mass and between 75% and 90% flat GO flakes by mass;
   casting or extruding the co-suspension into a water-containing fluid or into water, wherein the PAN is hydrolyzed, forming a gel that envelops the GO flakes, resulting in a H-PAN/GO material;
   injecting the H-PAN/GO material into a mold, resulting in a H-PAN/GO molded electrode structure; and
   graphitizing the H-PAN/GO molded electrode structure by heating at 1,500° C. in a mechanical press in an inert atmosphere or a vacuum.

6. The method of claim 5, wherein the GO flakes are 5 to 20 microns across.

7. The method of claim 5, wherein the GO flakes are 5 to 14 microns across.

* * * * *